US006996684B2

(12) United States Patent
Tseng et al.

(10) Patent No.: US 6,996,684 B2
(45) Date of Patent: Feb. 7, 2006

(54) MULTIPLE-GRANT CONTROLLER WITH PARALLEL ARBITRATION MECHANISM AND RELATED METHOD

(75) Inventors: Timothy Tseng, Taipei Hsien (TW); Murphy Chen, Taipei Hsien (TW)

(73) Assignee: VIA Technologies Inc., Hsin-Tien (TW)

( * ) Notice: Subject to any disclaimer, the term of this patent is extended or adjusted under 35 U.S.C. 154(b) by 367 days.

(21) Appl. No.: 10/249,488

(22) Filed: Apr. 14, 2003

(65) Prior Publication Data

US 2004/0068625 A1    Apr. 8, 2004

(30) Foreign Application Priority Data

Oct. 3, 2002  (TW) ............................... 91122912 A

(51) Int. Cl.
*G06F 12/00* (2006.01)
(52) U.S. Cl. .................... 711/151; 711/154; 710/40; 710/240
(58) Field of Classification Search ................ 711/151, 711/154, 167, 152; 710/113, 114, 115, 116, 710/117, 118, 119, 120, 121, 122, 123, 124, 710/125, 43, 40, 41, 42, 240, 241, 242, 243, 710/244, 309; 345/535; 327/19
See application file for complete search history.

(56) References Cited

U.S. PATENT DOCUMENTS

| | | | | |
|---|---|---|---|---|
| 4,314,335 A | * | 2/1982 | Pezzi ........................ 710/243 |
| 5,832,278 A | * | 11/1998 | Pham ........................ 710/243 |
| 6,205,524 B1 | * | 3/2001 | Ng ............................. 711/151 |
| 6,898,659 B2 | * | 5/2005 | Yoo et al. ................... 710/306 |
| 2003/0191900 A1 | * | 10/2003 | Hooker ....................... 711/137 |
| 2004/0068625 A1 | * | 4/2004 | Tseng et al. ............... 711/151 |

OTHER PUBLICATIONS

"Microsoft Dictionary", © 1997 Microsoft Press, p. 307.*
Shalan, et al., "Hardware Support for Real-Time Embedded Multiprocessor System-on-a-Chip Memory Management", © 2002 ACM, p. 79-84.*

* cited by examiner

*Primary Examiner*—Brian R. Peugh
(74) *Attorney, Agent, or Firm*—Winston Hsu

(57) ABSTRACT

A controller embeds a volatile memory, a plurality of application circuits and an arbiter. Each of the application circuits is capable of sending a request signal to request access the volatile memory and has a unique priority. When some of the application circuits send requests in a same period, the arbiter selects application circuits with higher priority among those application circuits such that the selected application circuits are allowed to access the volatile memory. The arbiter includes a plurality of arbiter modules and a main arbiter module. Each of the arbiter modules is assigned to a unique set of application circuits in the controller such that the arbiter modules can select higher priority application circuits in the corresponding sets at the same time. The main arbiter module further selects application circuits for accessing the volatile memory according to application circuits selected by the arbiter modules.

10 Claims, 10 Drawing Sheets

MULTIPLE-GRANT CONTROLLER WITH PARALLEL ARBITRATION MECHANISM AND RELATED METHOD

BACKGROUND OF INVENTION

1. Field of the Invention

The invention relates to an apparatus for arbitrating access priority of a volatile memory for a plurality of circuit modules and a method related thereto, and more particularly, to an apparatus for classifying circuit modules into different groups to arbitrate access priority parallelly, and related method, so as to shorten the arbitrating time and to simplify the circuit arrangement of the apparatus.

2. Description of the Prior Art

Controllers are an important building block of modern information systems. Controllers are capable of complex calculations and management of data, and so are used in various automatic devices and computer systems. As technology becomes more sophisticated, the number of circuits integrated into a controller increases, and this provides the controller with an increasingly more powerful and complex functionality.

A controller contains a plurality of circuit modules with different functions. Aggregating the different functions of these circuit modules provides the entire functionality of the controller. A controller may integrate a volatile memory that is a shared resource for all of the circuit modules. For example, a controller integrates a memory, preferably a static random access memory (SRAM) for storing operational data for each circuit module, and each of the circuit modules accesses the memory to complete its respective function. To effectively manage the system resources in the controller, only a predetermined number of circuit modules can access the same volatile memory in a period of time, and the controller thus contains arbiters to control each circuit module to manage the same volatile memory resource. Please refer to FIG. 1, which is a schematic diagram of function blocks of a typical controller 10. The controller 10 may be, for example, a switch controller used in a network switch, managing the exchange of information between network terminals. As shown in FIG. 1, application circuits CP1–CP56 are block circuits in the controller 10, which respectively perform every essential function of the controller 10. In the controller 10, the application circuits CP1–CP56 commonly access volatile memory 12 of the controller 10. For managing access to the volatile memory 12 of CP1–CP56, an arbiter 14 is usually provided in the controller 10. When an application circuit CP1–CP56 seeks to access the volatile memory 12, the application circuit CP1–CP56 sends a request signal to the arbiter 14. Since the volatile memory 12 can only serve a predetermined number of application circuits CP1–CP56, the arbiter 14 will select only the predetermined number of application circuits CP1–CP56 to access the volatile memory 12 when more than the predetermined amount of application circuits CP1–CP56 send request signals at the same time. The other unselected application circuits CP1–CP56 are not granted access to the volatile memory 12 at this stage. In practice, the arbiter 14 and every application circuit of the controller 10 are driven by a clock signal CLK, which has a period T. The arbiter 14 accepts request signals from each application circuit in a clock cycle (i.e., the time period T0 as shown in FIG. 1), and then allows a proper amount of application circuits CP1–CP56 to access the volatile memory 12, as per their individual requests, in the next clock cycle (the time period T1). In other words, the arbiter 14 must decide, in the current clock cycle (time period T0), which application circuits CP1–CP56, among all of the application circuits CP1–CP56 that send request signals, can actually access the volatile memory 12 in the next clock cycle (time period T1).

To decide which application circuits CP1–CP56 can actually access the volatile memory 12, every circuit application CP1–CP56 has an access priority individually. The arbiter 14 first selects those application circuits CP1–CP56 with the highest priority among all application circuits CP1–CP56 that send request signals, and these highest-priority application circuit CP1–CP56 are then permitted to access the memory 12. By way of example, assume that the controller 10 contains application circuits CP1–CP56 that share the volatile memory 12, and the volatile memory 12 can only serve four application circuits in a same time period (i.e., in a same clock cycle). The application circuit with the highest priority is application circuit CP1, the application circuit with the second highest priority is application circuit CP2, and so on; the application circuit with the lowest priority is thus application circuit CP56. In other words, the priority of application circuit CP1 is higher than the priority of application circuit CP2; the priority of application circuit CP2 is higher than the priority of application circuit CP3; and so on. If application circuits CP2, CP3, CP27, CP29, CP58, CP57, and CP56 all send request signals in the time period T0, the arbiter 14 will select the four application circuits with the highest priority: application circuits CP2, CP3, CP27, and CP29 are thus selected, as the volatile memory 12 can only simultaneously serve four application circuits. The four selected application circuits CP2, CP3, CP27, and CP29 can then access the volatile memory 12.

Please refer to FIG. 2, which is a function block diagram according to prior art of the arbiter 14 shown in FIG. 1. Continuing with the previous example, the controller 10 contains 56 application circuits, and the arbiter 14 must select the four application circuits with the highest priority among a plurality of the application circuits sending request signals. Therefore, arbiter modules 21–24, which select 1 output from 56 inputs (56-to-1), are provided in the arbiter 14 to select an application circuit with a highest respectively priority. The application circuits are all connected to the arbiter 14. When an application circuit sends a request signal, it sends a high level signal on its corresponding request trace; when the application circuit is not sending a request signal, it keeps the voltage of its corresponding trace low. In FIG. 2, traces RP1–RP56 are the traces of application circuits CP1–CP56 for transferring request signals to arbiter 14. The 56 traces can be treated as an input bus REQ0 of the arbiter 14, and the input REQ0 is provided to every arbiter module 21–24. After the arbiter module 21 receives the input REQ0, it selects an application circuit with the highest priority among the application circuits sending request signals, and generates a corresponding output GR1. In practice, the arbiter module 21 can use another 56 traces to form the output GR1, wherein each trace of the 56 traces corresponds to an application circuit respectively. The arbiter module 21 outputs a high level signal on the trace corresponding to the selected application circuit, and keeps the other traces low. The arbiter module 22 then selects an application circuit with the second highest priority among the application circuits sending request signals. Thus the arbiter module 22 not only needs to know which application circuits have sent request signals, but also needs to know which application circuit was selected by the arbiter module 21, as obtained from the output GR1 of the arbiter module 21. The arbiter module 22 also sends an output GR2, which is a combination of 56 traces. Similarly, the arbiter module 23 selects an application circuit with the third highest priority after the arbiters 21 and 22 have selected one application circuit respectively. The arbiter module 23 needs to receive the input REQ0, the output GR1 of the arbiter module 21, and the output GR2 of the arbiter module 22, and thereby selects an application circuit with the third highest priority to produce a corresponding output GR3. Finally, the arbiter module 24 receives input REQ0 and outputs GR1, GR2, and GR3 of arbiters 21–23 to select an application circuit with the fourth highest priority, generating a corresponding output GR4. Collecting the four application circuits selected by arbiter modules 21–24, the arbiter 14 produces an output bus GRN0, wherein the output GRN0 is formed from 56 traces respectively corresponding to each application circuit. According to the four selected application circuits, the arbiter 14 raises the voltages of the four traces to high, indicating that the arbiter 14 permits the four selected application circuits to access the volatile memory 12. The voltages of the other traces of the unselected application circuits, because of their lower priority, and the application circuits not sending request signals, are kept low, indicating that those application circuits are not permitted to access the volatile memory 12. In FIG. 2, the traces GP1–GP56, which form the output GRN0, correspond to application circuits CP1–CP56 respectively.

A practical example is used in the following to illustrate the operation of arbiter 14. If seven application circuits CP2, CP3, CP27, CP29, CP53, CP54, and CP56 assert request signals in a time period T0 (with reference to FIG. 1), the traces RP2, RP3, RP27, RP29, RP53, RP54, and RP56 of the input REQ0 will be high (indicated by mark "H" in FIG. 2). The arbiter module 21 selects the application circuit CP2, which has the highest priority, from the seven application circuits mentioned above, then raises the trace, which corresponds to application circuit CP2, of the output GR1 to high (CP2 is thus indicated in parentheses). The arbiter module 22 then selects application circuit CP3, which has the second highest priority, from the seven application circuits according to the input REQ0 and output GR1. The arbiter module 22 also raises the corresponding trace of application circuit CP3 to high in its output GR2. In practice, the structures of the arbiter modules 22–24 are nearly identical to the structure of the arbiter module 21. The arbiter module 22 uses the output GR1 of the arbiter module 21 to mask the application circuit CP2 selected by arbiter module 21, so the arbiter module 22 will select the application circuit CP3 with the highest priority among the six application circuits CP3, CP27, CP29, CP53, CP54, and CP56. Then, the arbiter module 23 uses the outputs GR1 and GR2 to mask to request signals of application circuits CP2 and CP3, and therefore arbiter module 23 chooses the application circuit CP27 from application circuits CP27, CP29, CP53, CP54, and CP56 and sets the trace corresponding to the output GR3 high. Finally, the arbiter module 24 selects the application circuits CP29 after application circuits CP2, CP3, and CP27 are masked. Collecting the selected application circuits CP2, CP3, CP27, and CP29, the four traces GP2, GP3, GP27, and GP29 in the output GRN0 of the arbiter 14 are raised high. In the time period T1 after T0 (in FIG. 1), the controller 10 permits the application circuits CP2, CP3, CP27, and CP29 to access the volatile memory 12 according to the output GRN0 of the arbiter 14. In another aspect, if only two application circuits CP2 and CP54 send request signals in time period T0, arbiter modules 21 and 22 will select the application circuits 21 and 22 respectively, and the other arbiter modules 22 and 23 will not raise the outputs GR3 and GR4. In other words, the arbiter modules 23 and 24 will not give access permission to any other application circuits.

The disadvantages of the arbiter 14 of the prior art are discussed in the following. First, every arbiter module 21–24 has to handle the input REQ0 from every application circuit of the controller 10, so each arbiter module is formed from many logic gates. In the above example, there are 56 application circuits in the controller 10 that may request access to the volatile memory 12 at the same time, and so the arbiter modules 21–24 all need to have the ability to select as output 1 input from 56 inputs (56-to-1 functionality). The inputs and outputs of arbiter modules 21–24 all have 56 traces, and this means that up to 56*56 inputs and outputs must be provided. Achieving such functionality requires a large number of logic gates to form the arbiter modules 21–24. When the gate count of the prior-art arbiter 14 increases, the associated cost of die area and energy consumption correspondingly increase. Furthermore, the associated propagation delay of each arbiter module 21–24 will also increase when the gate count increases. As discussed above, the arbiter modules 21–24 have to work in a sequential order to select the four application circuits having the highest priorities. The arbiter module 22 depends upon the output GR1 of the arbiter module 21 to select the application circuit having the second highest priority; the arbiter module 23 depends on the outputs GR1 and GR2 of the arbiter modules 21 and 22 to select the application circuit having the third highest priority; and the arbiter module 24 can not select the application circuit having the fourth highest priority until the operations of arbiter modules 21–23 are finished. The arbiter 14 thus must function in the sequential order of arbiter modules 21, 22, 23, and 24 to finish the arbitration, and the total propagation time is thus the sum of the propagation delays of each arbiter module 21–24. Based upon demands placed upon the controller 10, the arbiter 14 may have to finish arbitration in a single clock cycle. Hence, if the total propagation delay is so long that the arbiter 14 cannot finish the arbitration in a clock cycle, the controller 10 will either not work properly, or the controller 10 will require a longer clock cycle. As a result, the prior-art arbiter 14 requires long clock cycles, but the internal frequency of a modern controller goes high.

SUMMARY OF INVENTION

It is therefore a primary objective of the claimed invention to provide an arbiter that can work rapidly, and which has a smaller gate count and simpler arrangement to solve the above-mentioned problems.

In the prior art, the operating theory of an arbiter is to use sequentially cascaded arbiter modules to select application circuits having the highest priorities from all application circuits sending request signals in order, and so requires more gates in every arbiter module and costs much in terms of total propagation delay as the propagation delay is longer for each arbiter module.

In the present invention, a plurality of application circuits sharing the same system resource are divided into several groups, and each group is arbitrated by an arbiter module to select those respective application circuits having the highest priorities from the respective application circuits sending request signals. A main arbiter module then decides which application circuits can access the system resource according to the results from all arbiter modules of all the groups. Because an arbiter module only arbitrates a subset of the application circuits, the gate count and time delay of every arbiter module can be decreased. Furthermore, according to the present invention, the arbitration of every group can be performed at the same time, and thus the time cost by the priority arbitration of the arbiter can be substantially reduced to increase the operational efficiency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
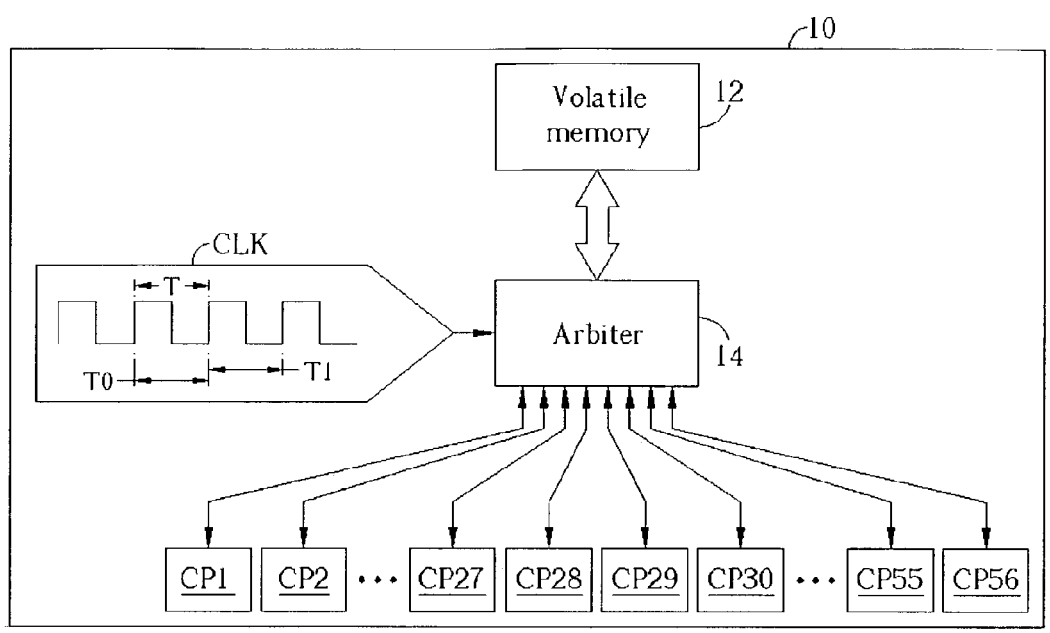
FIG. 1 is a schematic diagram of function blocks of a typical controller.
Figure 3:
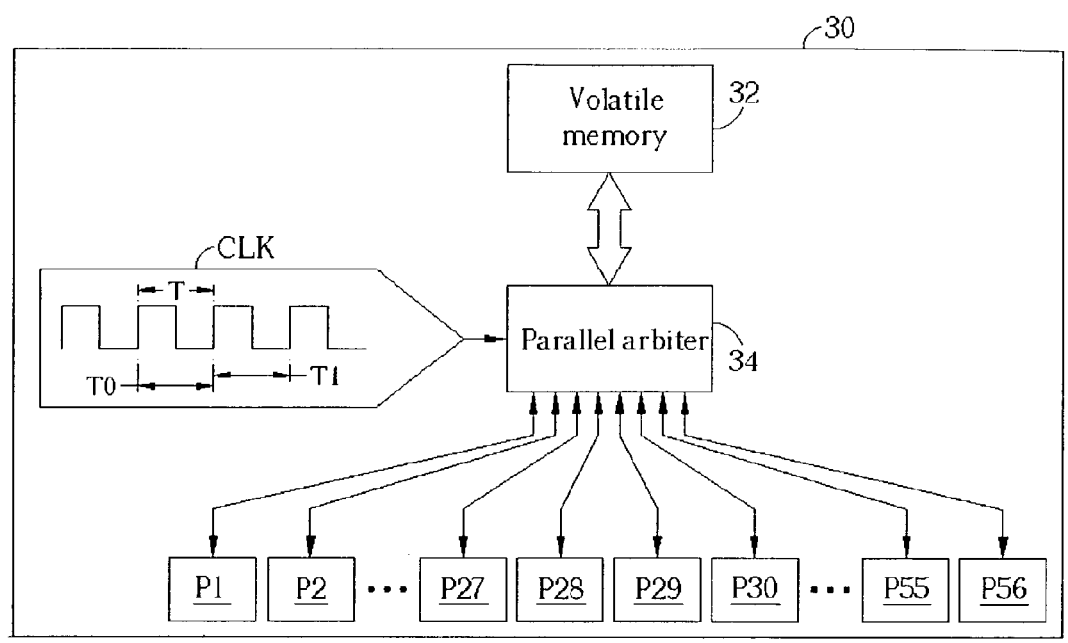
FIG. 3 is a schematic diagram of function blocks of a controller according to the present invention.

Please refer to FIG. 3, which is a schematic diagram of function blocks for a controller 30 according to present invention. The present invention can be applied in a typical controller 30 in FIG. 3. The controller 30 contains a plurality of application circuits P1–P56 to perform different functions to complete the entire functionality of the controller 30. The controller 30 also contains a volatile memory 32 to serve each application circuit. For managing the access of every application circuit to the volatile memory 32, a parallel arbiter 34 is provided in the controller 30, wherein the parallel arbiter 34 is used to arbitrate the accessing priority of the application circuits P1–P56. To provide comparison between the prior art and the present invention in a specific exemplary embodiment, assume that the controller 30 also contains 56 application circuits that may access the volatile memory 32. Application circuits P1, P2 to P55, P56 have the first highest priority, second highest priority to the second lowest priority, and lowest priority, respectively, and that will be the basis for the arbiter 34 to arbitrate the accessing priority of the application circuits P1–P56. The volatile memory 32 can serve four application circuits to access data at the same time. Similar to the controller 10 in FIG. 1, the controller 30 coordinates the operation of every application circuit and parallel arbiter 34 with a clock CLK. In a clock cycle T of clock signal CLK (for example, the time period T0 in FIG. 3), application circuits P1–P56 that need to access volatile memory 32 will assert request signals to parallel arbiter 34, and the parallel arbiter 34 will arbitrate the accessing priority in a clock cycle in time period T0 to decide which application circuits can actually access the volatile memory 32. Then, in the following time period P1, the application circuits P1–P56 selected by the parallel arbiter 34 can access the volatile memory 32.

Figure 4:
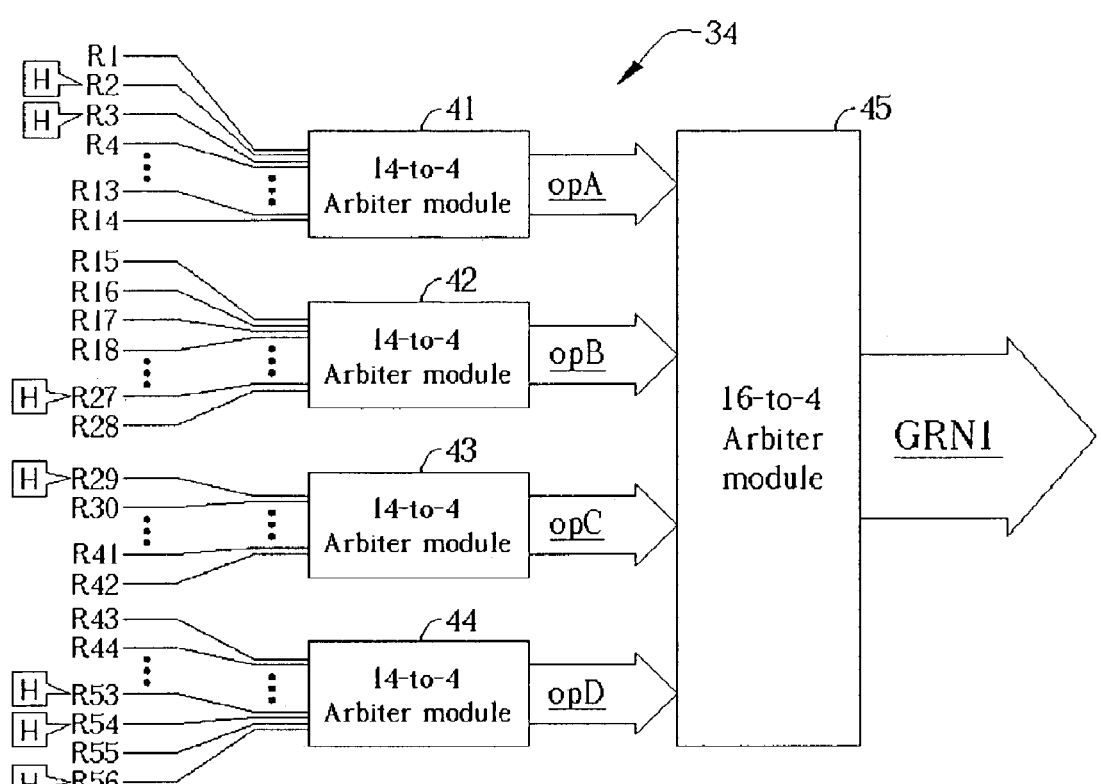
FIG. 4 is a function block diagram according to an embodiment of a parallel arbiter shown in FIG. 3.

Please refer to FIG. 4, which is a function block diagram according to an embodiment of the parallel arbiter 34 shown in FIG. 3. According to the present invention, the application circuits P1–P56 are divided into several groups. In every group, an arbiter module arbitrates the accessing priority of every application circuit P1–P56. Finally, a main arbiter module decides which application circuits P1–P56 can actually access the volatile memory 32 according to the arbitrating result from every arbiter module of every group. In this embodiment in FIG. 4, application circuits P1–P56 are divided into four groups: the first group contains the fourteen application circuits P1–P14 having the highest priority; the second group contains the fourteen application circuits P15–P23 having the second highest priority; the third group contains the fourteen application circuits P29–P42 having the third highest priority; and the fourth group contains the application circuits P43–P56 with the lowest priority. Since there are four groups of application circuits, the arbiter 34 also contains four 14-to-4 arbiter modules 41–44 and a 16-to-4 main arbiter module 45. The application circuits P1–P56 send request signals by corresponding traces R1–R56 respectively to their corresponding arbiter modules. For example, the traces R1–R14 send the request signals of application circuits P1–P14 respectively to the arbiter module 41, and the traces R43–R56 send the request signals of application circuits P43–P56 respectively to the arbiter module 44. The arbitrating result of the arbiter modules 41–44 are sent to the main arbiter module 45 by outputs opA, opB, opC, and opD respectively, and the main arbiter module 45 produces the final output GRN1 of the parallel arbiter 34 to indicate which four application circuits can access the volatile memory 32.

Please refer to FIGS. 5A–5E. FIGS. 5A–5E are function block diagrams of each arbiter module 41–44 and the main arbiter module 45 shown in FIG. 4. The arbiter modules 41–44 have the same primary structure. Taking the arbiter module 41 in FIG. 5A as an example, the arbiter module 41 contains four 14-to-1 arbiter units 51–54. Each arbiter unit 51–54 is used for selecting an application circuit, which sends a request signal, having the highest priority. The arbiter module 41 receives the input REQa passed by traces R1–R14 from application circuits P1–P14, and sends the input REQa to arbiter units 51–54. The arbiter unit 51 will select the application circuits P1–P14 having the highest priority among application circuits P1–P14 sending request signals, and then produce a corresponding output A1, wherein the output A1 can be signified by fourteen traces corresponding application circuits P1–P14 respectively. The arbiter unit 51 will raise the voltage of one trace to present the application circuit corresponding to the trace that is selected. Similarly, the arbiter unit 52 will receive the input REQa and the output A1 from the arbiter unit 51, and select an application circuit with a second highest priority from the application circuits sending request signals to produce a corresponding output A2. The arbiter unit 53 will receive the input REQa, outputs from arbiter units 51 and 52, and select an application circuit with the third highest priority to produce an output A3. Then the arbiter unit 52 will select an application circuit with the fourth highest priority to produce an output A4 according to the input REQa, and outputs A1, A2, and A3. Collecting the four selected application circuits from the result of the arbiter units 51–54, the arbiter module 41 can select four application circuits P1–P14 with the highest priorities from the application circuits P1–P14 sending request signals in the same period. In addition, the four OR gates 99 in the arbiter module 41 are used for executing OR operations of signals from each trace of the outputs A1, A2, A3, and A4, and send the results of these OR operations on state traces RA1–RA4 respectively. For example, when application circuits P2 and P3 send request signals in a same time period (the time period T0 in FIG. 3), the arbiter units 51 and 52 will select the application circuits P2 and P3 respectively, which have the highest and second highest priority. Thus the traces corresponding to application circuits P2 and P3 in output A1 and A2 will be raised high. The arbiter units 53 and 54 will not select any application circuits, so every trace in the outputs A3 and A4 are all kept low. As a result, the OR operation results of every signal on output A1 causes the state trace RA1 to be high; the result of the OR operation corresponding to output A2 causes the state trace RA2 to be high; the OR operation results corresponding to the outputs A3 and A4 respectively are that the state traces RA3 and RA4 are both low. In other words, the state traces RA1–RA4 indicate if the arbiter units 51–54 have respectively selected an application circuit. When there are more than four application circuits of the application circuits P1–P14 sending request signals in the same time period, the state traces RA1–RA4 all will be high, since the arbiter units 51–54 all need to select one application circuit respectively. As in the previous example, if the number of application circuits sending request signals is less than four, the state traces RA1–RA4 will show the number of application circuits sending request signals according to the order of the state traces RA1, RA2, RA3, and RA4. For example, if there are three application circuits sending request signals in a same time period, the state traces RA1, RA2, and RA3 will be raised high. If there are no application circuits sending request signals in the time period T0, the state traces RA1–RA4 will all be low. Collecting the output A1–A4 of arbiter units 51–54, and state traces RA1–RA4, forms the output opA (please see FIG. 3) of the arbiter module 41.

In this embodiment, the arbiter units 51–54 may have the similar circuit structure. The arbiter unit 52 can use the output A1 of the arbiter unit 51 to mask the selected application circuit of the input REQa by arbiter unit 51, and then the arbiter unit 52 can selected an application circuit with the highest priority from the residual application circuits in the input REQa. For example, if application circuits P2, P5, P10, and P14 send request signals in a same time period, the arbiter unit 51 will select the application circuit P2 because the application circuit P2 has the highest priority. Then the arbiter unit 52 will use the output A1 to mask the request of application circuit P2 and select the application circuit P5 from application circuits P5, P10, and P14. It should be noticed that application circuit P5 is the application circuit having the second highest priority. Similarly, arbiter unit 53 will use the outputs A1 and A2 to mask the application circuits P2 and P5 and select the application circuit P10 from the residual application circuits P10 and P14. Finally, the arbiter unit 54 will select the last residual application circuit P14. In other words, the arbiter 51, 52, 53, and 54 are sequentially cascaded to provide for masking of a following unit.

Figure 2:
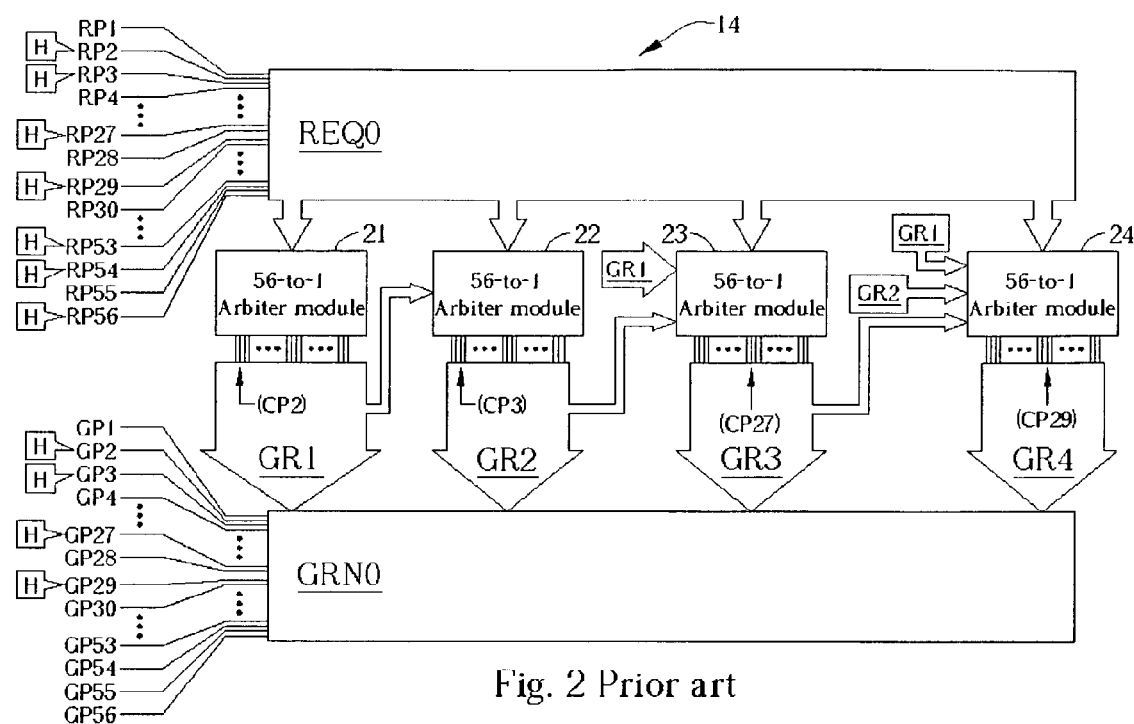
FIG. 2 is a function block diagram of the operations according to prior art of the arbiter shown in FIG. 1.

It should be noted that although the operation of the arbiter units mentioned above is similar to the operation of the arbiter modules according to the prior art in FIG. 2, the arbiter units 51–54 are only "14-to-1" arbiter devices, meaning that the controller only needs to provide 14*14 outputs and inputs. In contrast to a 56 to-1 arbiter device of the prior art, the present invention needs fewer gates for each arbiter unit, and this significantly reduces the propagation time delay for the operation of every arbiter unit.

Figure 5A:
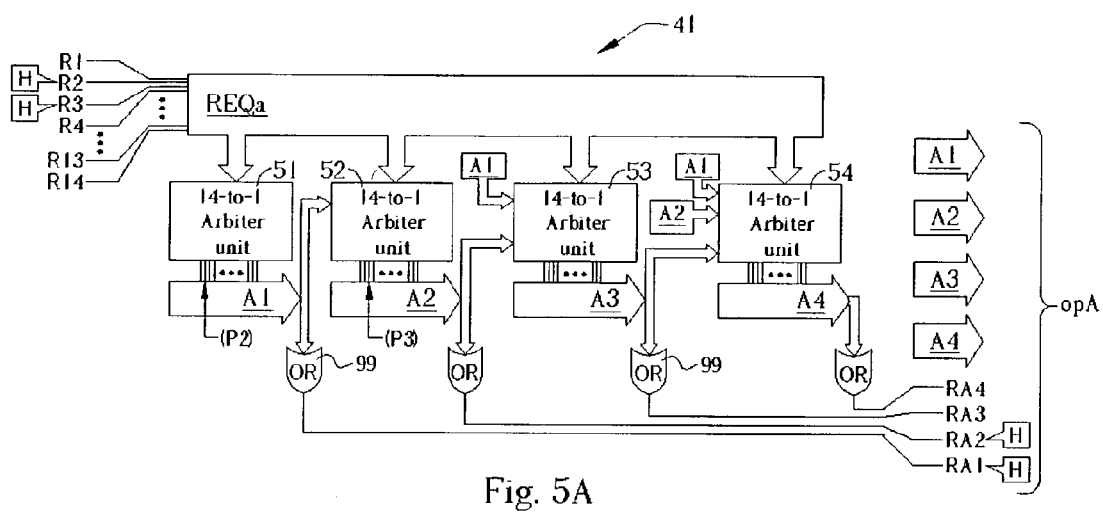
FIGS. 5A5D are function block diagrams according to an embodiment of each arbiter module shown in FIG. 4.
Figure 5B:
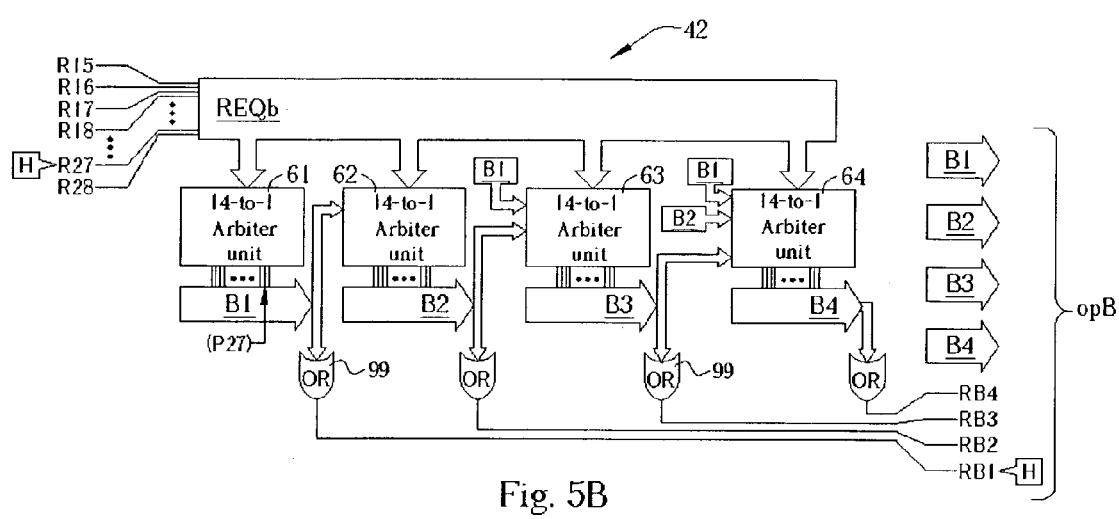
FIG. 5E is a function block diagram according to an embodiment of the main arbiter module shown in FIG. 4.
Figure 5C:
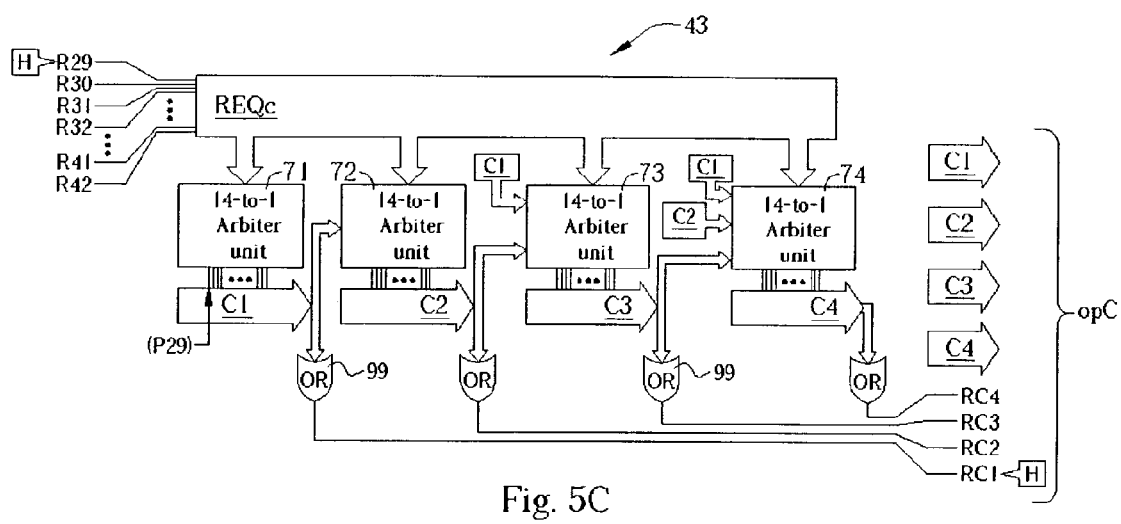
Figure 5D:
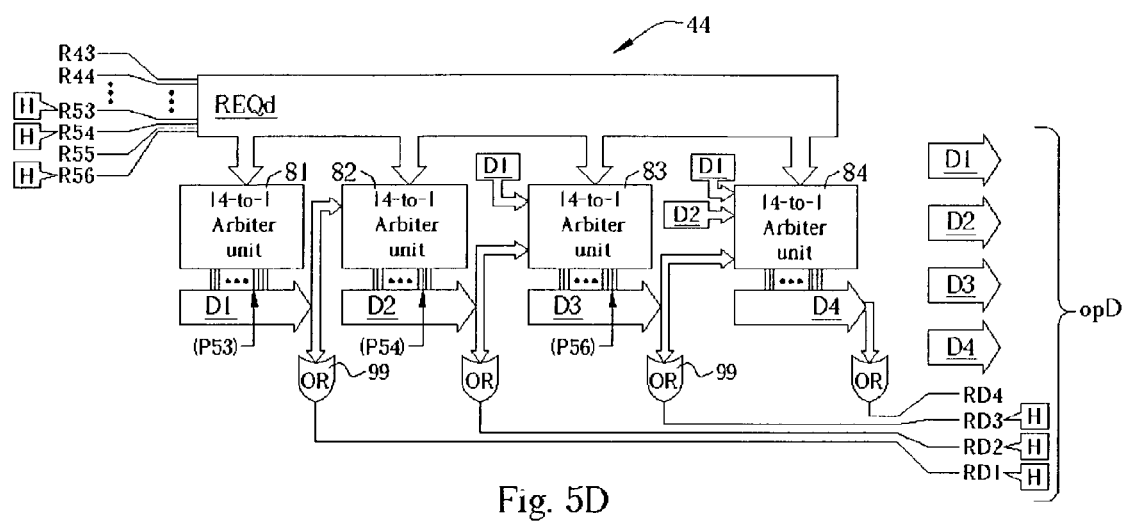

Similar to the arbiter units 51–54 of the arbiter module 41, the arbiter module 42 in FIG. 5B is used to arbitrate the application circuits P15–P28, and also contains four arbiter units 61–64. The arbiter module 41 receives request signals as the input REQb from traces R15–R28 for application circuits P15–P28 respectively. The arbiter units 61–64 produce arbitrating results B1–B4, and send each of their OR operation results RB1–RB4, to serve as the output opB (see FIG. 3) of the arbiter module 42. In FIG. 5C, The arbiter module 43 receives request signals as the input REQc along traces R29–R42 from application circuits P29–P42 respectively. The arbiter units 71–74 produce 14-to-1 arbitrating results C1–C4, and also send each of their OR operation results RC1–RC4. Thus the arbitrating results C1–C4 and OR operation results RC1–RC4 are the output opC of arbiter module 43. In FIG. 5D, The arbiter module 44 receives request signals as the input REQd along traces R43–R56 from application circuits P43–P56 respectively. The arbiter units 81–84 produce 14-to-1 arbitrating results D1–D4, and OR operation results RD1–RD4, to serve as the output opD of the arbiter module 44. The practice and operating characteristics of arbiter modules 42–44 are similar to those of arbiter module 41.

Figure 5E:
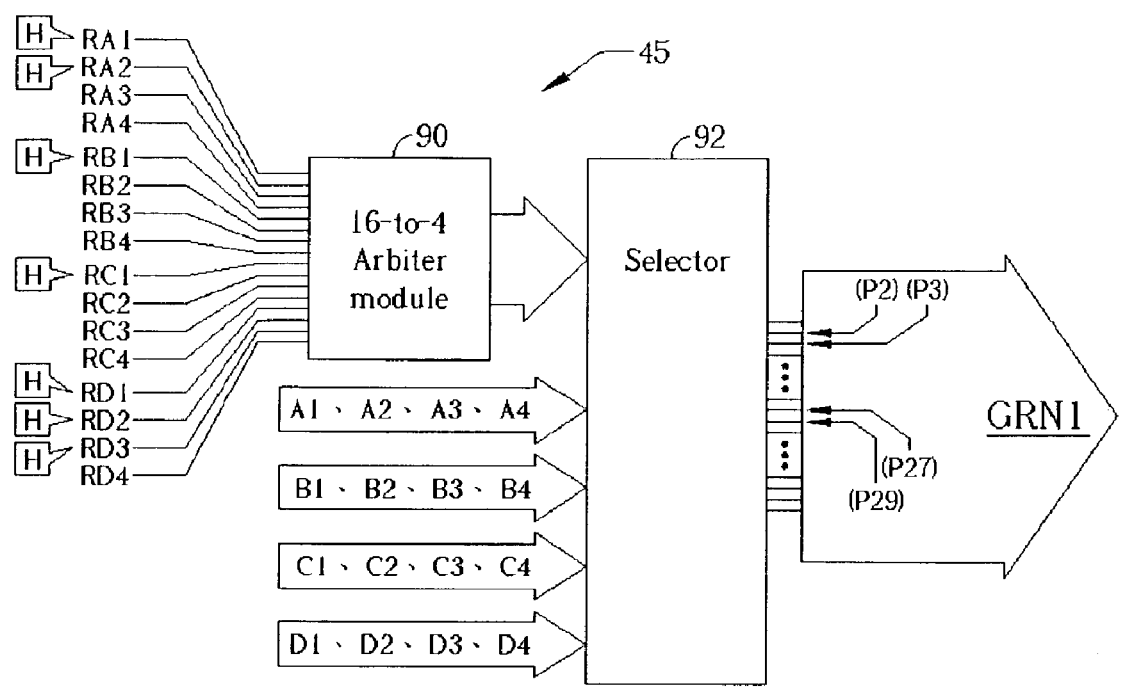

In FIG. 5E, the main arbiter module 45 contains a 16-to-4 arbiter module 90 and a selector 92. From the outputs opA–opD of arbiter module 41–44, the arbiter module 90 receives state traces RA1–RA4, RB1–RB4, RC1–RC4, and RD1–RD4 serving as arbitrating objects, and outputs the arbitrating result to the selector 92. Then, the selector 92 decides which four application circuits can actually access the volatile memory 32 according to the arbitrating result of arbiter module 90 and the outputs A1–A4, B1–B4, C1–C4, and D1–D4 of each arbiter unit. The operating theory of the main arbiter module 45 is described in the following. The arbitrating objects of the arbiter module 41 are application circuits P1–P14, which are the fourteen application circuits with the fourteen highest priorities. If several application circuits of these fourteen application circuits send request signals in a same time period, the arbiter unit 51 will select an application circuit with the highest priority from the several application circuits sending request signals. That means for every application circuit sending request signals in a same time period of the controller 30, the application circuit selected by the arbiter unit 51 must have the highest priority. In the same principle, if the arbiter unit 52 selects an application circuit, the selected application circuit must have the second highest priority of all the application circuit sending request signals, and so on. In this embodiment, the volatile memory 32 can serve four application circuits in a same time period, therefore the parallel arbiter 34 only needs to select four application circuits to access the volatile memory 32. Thus, if each of the arbiter units 51–54 selects an application circuit, the four selected application circuits must have the four highest priorities. Other application circuits selected by arbiter modules 42–44 have lower priorities than the priorities of the four application circuits selected by the arbiter module 41, so the volatile memory 32 will serve the four application circuits selected by the arbiter module 41. In other words, the arbiter module 41 selects four application circuits having the highest priority, so the arbitrating results of the arbiter unit 51–54 of arbiter module 41 are very important. The arbitrating result of the arbiter unit 51 is prior to the arbitrating result of the arbiter unit 52. In another aspect, if the arbiter module 41 only selects two application circuits (that means only two arbiter units of arbiter module 41 select application circuits), it is clear that that only two application circuits of application circuits P1–P14 have sent request signals. That means the volatile memory 32 can serve another two application circuits. Since the arbiter module 42 corresponds to the application circuits P15–P28 with the second highest fourteen priorities, the application circuits selected by arbiter units 61–64 of the arbiter module 42 will be served by the volatile memory 32.

If each of the arbiter units 61–63 selects an application circuit, the application circuits selected by arbiter units 61 and 62 surely have higher priority than the application circuit selected by arbiter unit 63. Therefore the volatile memory 32 will serve the application circuits selected by arbiter units 61 and 62.

In the above discussion, every arbitrating result of any arbiter unit has a different associated importance: the arbitrating result of the arbiter unit 51 of arbiter module 41 is the most important, and the arbitrating result of the arbiter unit 84 of arbiter module 44 is the least important. Each of the arbiter units can be treated as having a different unit priority: the arbiter unit 51 has the highest unit priority; the arbiter unit 52 has the second highest unit priority, and so on. Therefore the arbiter unit 61 has the fifth highest unit priority, and the arbiter unit 84 has the sixteenth highest unit priority, which means the least in terms of unit priority importance. The state traces RA1–RA4, RB1–RB4, RC1–RC4, and RD1–RD4 for transferring the OR operation results presents the arbitrating results of arbiter units 51–54, 61–64, 71–74, and 81–84 respectively. According to the present invention, the arbiter module 90, in the main arbiter 45, connected to the state traces RA1–RA4, RB1–RB4, RC1–RC4, and RD1–RD4 needs to select four arbiter units with the highest unit priorities according to the different unit priorities of the sixteen arbiter units. The four application circuits selected by the four arbiter units with the highest unit priorities can then access the volatile memory 32. After the arbiter module 90 selects four arbiter units with the highest unit priority, the selector 92 will find four corresponding application circuits selected by four selected arbiter units according to the outputs A1–A4, B1–B4, C1–C4, and D1–D4 to produce the output GRN1 of the main arbiter module 45. It should be noted that the state traces RA1–RA4 could also only indicate whether their corresponding arbiter units select any application circuits or not. Then, the selector 92 could find selected application circuits according to the output of these arbiter units chosen by the arbiter module 90.

Further description of the operation of the parallel arbiter 34 according to the present invention is presented in the following example. Please refer to FIGS. 3 and 4. In the controller 30, if application circuits P2, P3, P27, P29, P53, P54, and P56 send request signals in the time period T0, traces R2, R3, R27, R29, R53, R54, and R56 corresponding to those application circuits will be raised high (indicated by the mark "H" in FIG. 4). Application circuits P2 and P3 belong to the fourteen application circuits with the highest priority, so the request signals from application circuits P2 and P3 are received by the arbiter module 41; application circuit P27 belongs to the fourteen application circuits with the second highest priority, so the request signal from application circuit P27 is received by the arbiter module 42; application circuit P29 belongs to the fourteen application circuits with the third highest priority, so the arbiter module 43 receives its request signal; and application circuits P53, P54, and P56 belongs to the fourteen application circuits with the lowest priority, and so the arbiter module 44 takes care of their request signals. As shown in FIG. 5A, the arbiter units 51 and 52 respectively select application circuits 51 and 52 to provide the output A1 and A2 respectively: the trace in A1 corresponding to application circuit P2 is raised high, and the trace in A2 corresponding to application circuit P3 is raised high as well. Since only two application circuits of application circuits P1–P14 send request signals in time period T0, the arbiter units 53 and 54 will not select any application circuits. The OR gates 99 will output their OR operation results for outputs A1 and A2 to raise the state traces RA1 and RA2 to high (indicated the marks "H" in FIG. 5A). This indicates that each of the arbiter units 51 and 52 has selected one application circuit. In contrast, the state traces RA3 and RA4, corresponding to the arbiter units 53 and 54 that do not select any application circuits, are kept low. Likewise, only one application circuit P27 among the application circuits P15–P28 sends a request signal, and only one application circuit P29 among application circuits P29–P42 sends a request signal in the time period. The arbiter units 61 and 71 will select application circuits P27 and P29 respectively and raise the state traces RB1 and RC1 to high. For the arbiter module 44 in FIG. 5D, application circuits P53, P54, and P56 of the application circuits P43–P56 send request signals in time period T0. Therefore, arbiter units 81, 82, and 83 select application circuits P53, P54, and P56 according to their priority. Then state traces RD1, RD2, and RD3 are respectively raised high to indicate that each of the three arbiter units 81, 82, and 83 have selected one application circuit. Collecting the state traces RA1–RA4, RB1–RB4, RC1–RC4, and RD1–RD4 of all arbiter modules 41–44, the arbiter module 90 receives seven state traces RA1, RA2, RB1, RC1, RD1, RD2, and RD3 that are high, and the arbiter module 90 selects four associated arbiter units 51, 52, 61, and 71 having the highest unit priorities. The arbiter module 90 sends the selecting result to the selector 92, and selector 92 selects application circuits P2, P3, P27, and P29 according to outputs A1, A2, B1, and C1 from arbiter units 51, 52, 61, 71, respectively. Similar to the output of a prior-art arbiter, fifty-six traces may represent application circuits P1–P56 in the selector 92, so the selector 92 will raise the traces corresponding to application circuits P2, P3, P27, and P29 to form the output GRN1 of the parallel arbiter 34 for permitting the four application circuits with the highest priority to access system resource. The arbitrating process is then finished.

Figure 6:
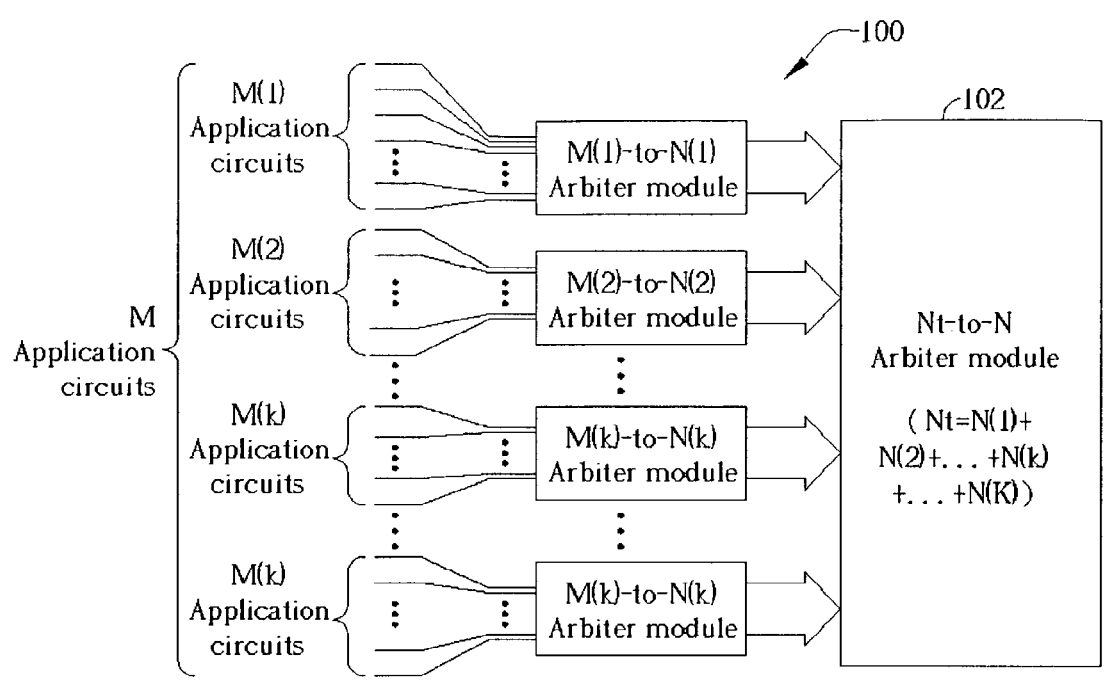
FIG. 6 is a block diagram according to another embodiment of the present invention.

Please refer to FIG. 6. FIG. 6 is a block diagram of a general embodiment according to the present invention. Assume that there are M application circuits sharing a common volatile memory in a controller, and the volatile memory can serve N application circuits at the same time. The arbiter 100 is used for arbitrating access of all application circuits to the volatile memory. According to the present invention, these M application circuits are divided into K groups, and each group has M(1), M(2), . . . M(K) application circuits with sequentially decreasing priorities. Consequently, M(1)+M(2)+ . . . +M(k)+ . . . +M(K)=M. The controller 100 contains M (1)-to-N(1), M(2)-to-N(2), . . . M(k)-to-N(k) arbiter modules, wherein N(1), N(2), . . . N(k) are all greater than or equal to N. The main arbiter module 102 can select N application circuits from the Nt arbitrating results of every arbiter module, wherein Nt=N(1)+N(2)+ . . . N(k)+ . . . N(K). In addition to the practical method shown in FIGS. 5A–5E, a parallel controller 34 in FIG. 4 according to the present invention may also by provided to produce the final output GRN1 by way of signal coding. For example, arbiter modules 41–44 can code the arbitrating results respectively and transfer those results to the main arbiter module 45, and then the main arbiter module 45 will further select four application circuits that can actually access the volatile memory. Consequently, the main spirit of the present invention is to divide application circuits of a controller into several groups, wherein every group has its own arbiter module to simultaneously perform the arbitration to reduce the overall arbitrating time. As every arbiter module needs to perform arbitration for a fewer number of application circuits, the gate count for implementing an arbiter module can also be reduced.

Those skilled in the art will realize from the above disclosure that the volatile memory may be disposed outside of the controller in the above-mentioned embodiments. In addition, the present invention is suitable for microprocessors or system on chip (SOC) circuits. For SOC, it is preferable to coordinate a static random access memory with a plurality of application modules, wherein the application modules may access the static random access memory. The parallel arbiter of the present invention can be used on SOC to enhance the SOC in a multiple grant and high-rate chip design to control the critical period of the clock signal, and reduce the total number of gates.

To contrast the prior art with the present invention, please refer to FIG. 2 and FIG. 4. Both of the two embodiments need to arbitrate fifty-six application circuits to select four application circuits that can access a common system resource at the same time. In the prior art, four 56-to-1 arbiter modules are sequentially cascaded to perform arbitration in order. Therefore, every arbiter module has 56 inputs and 56 outputs, and requires more logic gates, increasing the total time for arbitration, which is the sum of the propagation delays of the four arbiter modules. In contrast, the present invention divides the 56 application circuits into four groups, and each group has its own 14-to-4 arbiter module to perform the arbitration simultaneously. Then, a main arbiter module further arbitrates to select four application circuits. Since the arbitrating objects of each arbiter module, and the main arbiter module of the present invention, have far fewer inputs than the fifty-six of the prior art, the gate count needed to provide the arbiter modules and the main arbiter module is significantly reduced, and the propagation delays are correspondingly reduced. In addition, because all arbiter modules work simultaneously, the total arbitrating time of the present invention is the sum of the arbitrating time of only one arbiter module and the main arbiter module. To practice the present invention in switch chips, those skilled in the art will observe the total gate count is only 60% of the prior-art gate count, and will reduce the layout area, working power, and arbitrating time to increase the efficiency of the controller.

Those skilled in the art will readily observe numerous modifications and alterations of the device may be made while retaining the teachings of the invention. Accordingly, the above disclosure should be construed as limited only by the metes and bounds of the appended claims.

What is claimed is:

1. A multiple-grant controller for parallelly arbitrating system resources, the multiple-grant controller comprising:
   a volatile memory;
   a plurality of application circuits wherein when accessing the volatile memory, each of the application circuits is capable of sending a request signal with a unique priority corresponding to each application circuit so that each of the application circuits has a unique priority; and
   a parallel arbiter wherein when a first plurality of the application circuits assert request signals in a period of time, the arbiter will select a number of the application circuits with highest priority according to the first plurality of application circuits such that the selected application circuits are allowed to access the volatile memory and the number of the application circuits does not exceed a predetermined number, the arbiter comprising:
   a plurality of arbiter modules for receiving the request signals wherein each of the arbiter modules is assigned to receive part of the request signals and to parallelly output an arbiter result, wherein each of the arbiter modules comprises a plurality of arbiter units, wherein each of the arbiter units has a unit priority, and the arbiter units arbitrate to select a request sinal asserted by a related application circuit with highest priority according to part of the request signals received by each of the arbiters; and
   a main arbiter module electrically connected to the arbiter modules for receiving the arbiter results, wherein the main arbiter module grants the number of the application circuits with the higher priority access to the volatile memory according to the arbiter results.

2. The multiple-grant controller of claim 1 wherein part of the request signals received by each of the arbiters is mutually different.

3. The multiple-grant controller of claim 1 wherein the volatile memory is a static random-access memory.

4. The multiple-grant controller of claim 1 wherein each of the arbiter modules selects the application circuits with higher priority among those application circuits according to part of the request signals received by each of the arbiters, and the amount of selected application circuits does not exceed a predetermined number.

5. The multiple-grant controller of claim 1 wherein the arbiter modules are cascaded, and the request signals asserted by the related application circuits with higher priority is treated as part of the request signals to be received by a plurality of arbiter unit masks that is cascaded with the arbiter units.

6. A method for parallelly arbitrating system resources, comprising:
   providing a volatile memory and a plurality of application circuits, wherein when accessing the volatile memory, each of the application circuits is capable of sending a request signal with a unique priority corresponding to each application circuit so that each of the application circuits has a unique priority;
   utilizing a parallel arbiter to select a number of the application circuits with highest priority according to the first plurality of application circuits when a first plurality of the application circuits assert request signals in a period of time such that the selected application circuits are allowed to access the volatile memory and the number of the application circuits does not exceed a predetermined number;
   receiving the request signals with a plurality of arbiter modules, wherein each of the arbiter modules is assigned to receive part of the request signals and to parallelly output an arbiter result, each of the arbiter modules comprising a plurality of arbiter units, wherein each of the arbiter units has a unit priority, and the arbiter units arbitrate to select a request signal asserted by a related application circuit with highest priority according to part of the request signals received by each of the arbiters;
   receiving the arbiter results with a main arbiter module electrically connected to the arbiter modules; and
   granting the number of the application circuits with the higher priority access to the volatile memory according to the arbiter results.

7. The method of claim 6 wherein part of the request signals received by each of the arbiters is mutually different.

8. The method of claim 6 wherein die volatije memory is a static random-access memory.

9. The method of claim 6 wherein each of the arbiter modules selects the application circuits with higher priority among those application circuits according to part of the request signals received by each of the arbiters, and the amount of selected application circuits does not exceed a predetermined number.

10. The method of claim 6 wherein the arbiter modules are cascaded, and the request signals asserted bythe related application circuits with higher priority is treated as part of the request signals to be received by a plurality of arbiter unit masks that is cascaded with the arbiter units.

* * * * *